(12) United States Patent
Walker et al.

(10) Patent No.: US 9,521,219 B2
(45) Date of Patent: Dec. 13, 2016

(54) SYSTEMS, METHODS, AND APPARATUSES USING COMMON ADDRESSING

(71) Applicant: Echelon Corporation, San Jose, CA (US)

(72) Inventors: Robert Walker, Milpitas, CA (US); Robert A. Dolin, Menlo Park, CA (US); Glen M. Riley, Saratoga, CA (US); Kevin Blomseth, San Jose, CA (US)

(73) Assignee: Echelon Corporation, San Jose, CA (US)

( * ) Notice: Subject to any disclaimer, the term of this patent is extended or adjusted under 35 U.S.C. 154(b) by 0 days.

(21) Appl. No.: 14/159,188

(22) Filed: Jan. 20, 2014

(65) Prior Publication Data

US 2015/0207772 A1 Jul. 23, 2015

(51) Int. Cl.
*H04L 29/06* (2006.01)
*H04L 29/12* (2006.01)

(52) U.S. Cl.
CPC ............. *H04L 69/18* (2013.01); *H04L 61/103* (2013.01); *H04L 61/2015* (2013.01); *H04L 61/2038* (2013.01); *H04L 61/2076* (2013.01); *H04L 61/6004* (2013.01); *H04L 61/6072* (2013.01)

(58) Field of Classification Search
CPC ............... H04L 61/103; H04L 61/2015; H04L 61/2038; H04L 61/2076; H04L 61/6004; H04L 61/6072; H04L 69/18; H04L 69/08; H04L 69/162; H04L 12/1836
See application file for complete search history.

(56) References Cited

U.S. PATENT DOCUMENTS

| 5,950,195 A * | 9/1999 | Stockwell ............... H04L 63/02 |
| 6,038,233 A * | 3/2000 | Hamamoto et al. .......... 370/401 |
| 6,775,804 B1 * | 8/2004 | Dawson ........................ 714/776 |
| 6,839,346 B1 * | 1/2005 | Kametani ............... H04L 45/00 370/389 |
| 7,058,728 B1 * | 6/2006 | Eklund ......................... 709/247 |
| 7,120,725 B2 * | 10/2006 | Sandy ..................... H04L 69/08 709/238 |
| 8,234,394 B2 * | 7/2012 | Batke et al. ................... 709/230 |
| 8,437,322 B1 * | 5/2013 | Klingen .............. H04L 12/4633 370/338 |
| 2002/0009073 A1* | 1/2002 | Furukawa ............... H04L 29/06 370/352 |
| 2002/0172174 A1* | 11/2002 | Dick ................... H04L 12/4633 370/338 |
| 2002/0186698 A1* | 12/2002 | Ceniza ................ H04L 12/4641 370/401 |
| 2002/0196782 A1* | 12/2002 | Furukawa ............ H04Q 3/0025 370/352 |

(Continued)

OTHER PUBLICATIONS

IOS/IEC 14908-4—Information technology—control network protocol, Part 4: IP commuication, Feb. 15, 2012.*

*Primary Examiner* — Dung B Huynh
(74) *Attorney, Agent, or Firm* — Nicholson De Vos Webster & Elliott LLP

(57) ABSTRACT

Described herein are systems, methods, and apparatuses for device communication over IP. In some embodiments, IPv6 addresses are compressed into ISO/IEC 14908-1 addresses, and use leading zero suppression to compress the headers. In some embodiments, IPv4 the least significant two bytes of the IPv4 address are used as an ISO/IEC 14908-1 subnet and node number.

10 Claims, 15 Drawing Sheets

(56) References Cited

U.S. PATENT DOCUMENTS

| | | | |
|---|---|---|---|
| 2003/0007497 A1* | 1/2003 | March et al. | 370/410 |
| 2003/0048804 A1* | 3/2003 | Inouchi et al. | 370/466 |
| 2003/0065817 A1* | 4/2003 | Benchetrit et al. | 709/245 |
| 2003/0219011 A1* | 11/2003 | Han | 370/352 |
| 2004/0004968 A1* | 1/2004 | Nassar | 370/401 |
| 2004/0103212 A1* | 5/2004 | Takeuchi et al. | 709/245 |
| 2004/0122978 A1* | 6/2004 | Bird | 709/246 |
| 2004/0190549 A1* | 9/2004 | Huitema | 370/466 |
| 2004/0246991 A1* | 12/2004 | Tsuzuki et al. | 370/466 |
| 2005/0147097 A1* | 7/2005 | Chari et al. | 370/392 |
| 2005/0286553 A1* | 12/2005 | Wetterwald et al. | 370/466 |
| 2006/0098644 A1* | 5/2006 | Pullela et al. | 370/389 |
| 2006/0109807 A1* | 5/2006 | Lee | 370/315 |
| 2006/0215657 A1* | 9/2006 | Lee et al. | 370/389 |
| 2007/0081512 A1* | 4/2007 | Takeda et al. | 370/349 |
| 2007/0147421 A1* | 6/2007 | Kim | 370/466 |
| 2007/0280247 A1* | 12/2007 | Mera | H04L 12/4633 370/392 |
| 2008/0008192 A1* | 1/2008 | Matoba | 370/397 |
| 2008/0095179 A1* | 4/2008 | Lee et al. | 370/401 |
| 2008/0192756 A1* | 8/2008 | Damola et al. | 370/400 |
| 2010/0014485 A1* | 1/2010 | Henry | G06F 13/387 370/331 |
| 2010/0223401 A1* | 9/2010 | Matsuhira | H04L 12/4604 709/249 |
| 2010/0262313 A1* | 10/2010 | Chambers et al. | 700/295 |
| 2011/0038377 A1* | 2/2011 | Haddad | 370/395.53 |
| 2012/0004739 A1* | 1/2012 | Sato et al. | 700/7 |
| 2012/0254967 A1* | 10/2012 | Braun | 726/7 |
| 2013/0151708 A1* | 6/2013 | Shelby et al. | 709/226 |
| 2014/0269950 A1* | 9/2014 | Sutterlin | 375/257 |

\* cited by examiner

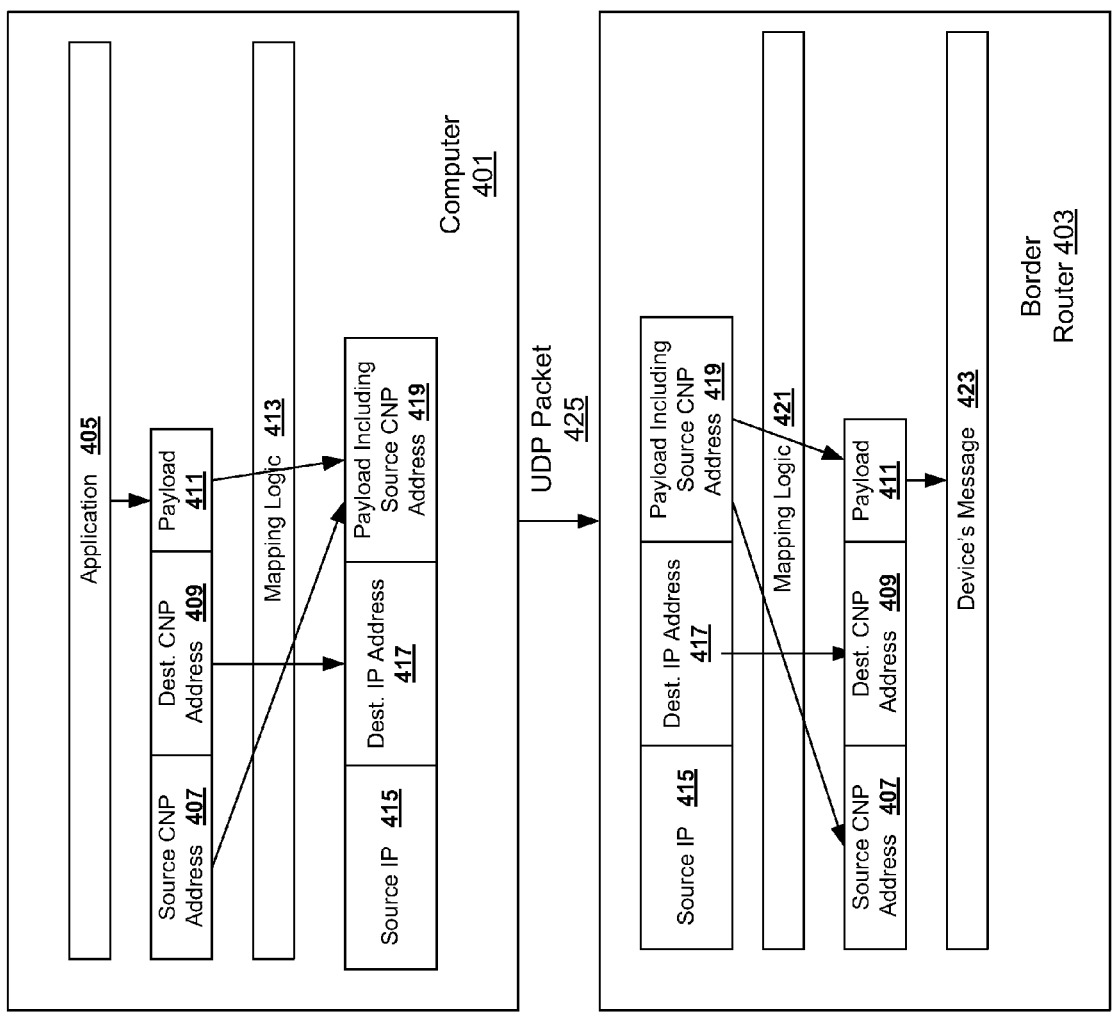

DomainID is 112233445566:

- The domain broadcast address is:

```
  |  16  |<---- 48 ---->|<---- 48 ---->| 8  | 8  |
  ------------------------------------------------
  | FF18 | 112233445566 | 4C5349505636 | 00 | 00 |
  ------------------------------------------------
  ```

- The subnet broadcast address for subnet ID 88 is

```
  |  16  |<---- 48 ---->|<---- 48 ---->| 8  | 8  |
  ------------------------------------------------
  | FF18 | 112233445566 | 4C5349505636 | 00 | 88 |
  ------------------------------------------------
  ```

- The group address for group 99 is

SYSTEMS, METHODS, AND APPARATUSES USING COMMON ADDRESSING

FIELD OF INVENTION

The field of invention relates generally to addressing in heterogenous networks.

BACKGROUND

Over many years control systems have become networked rather than using point-to-point wiring of analog and digital signals back to a controller. The communication protocols for these networks were typically proprietary and application specific. More recently attempts have been made to create protocols that spanned multiple application areas. One such protocol, ISO/IEC 14908-1 has achieved widespread adoption since its introduction in 1991.

BRIEF DESCRIPTION OF THE DRAWINGS

The present invention is illustrated by way of example and not limitation in the figures of the accompanying drawings, in which like references indicate similar elements and in which:

FIG. 11 illustrates examples of domain broadcast, subnet broadcast, and group broadcast;

DETAILED DESCRIPTION

Figure 1:
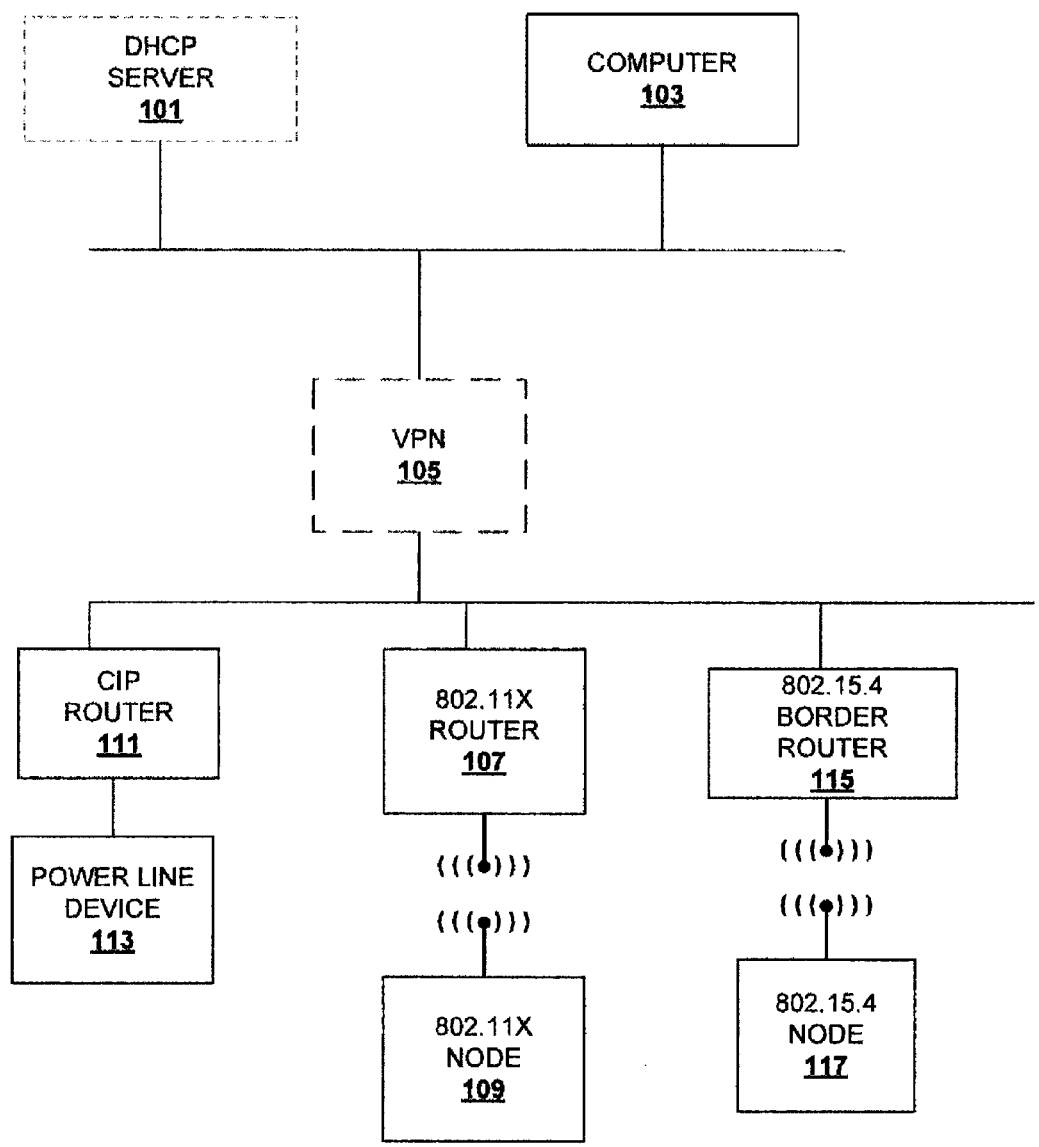
FIG. 1 illustrates of an exemplary network of devices that are capable of communicating with each other using Internet Protocol ("IP") addressing.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The next evolution of control system protocols is to host their application layers on top of the Internet Protocol (IP) so that common communications architecture can be shared across the enterprise, and so that new communication links that support IP may be incorporated into these systems. However, the IP suite is a client/server set of protocols, while most control system protocols make extensive use of multicast so that many nodes may be updated with a sensor value, for example. Services such as system wide broadcast and acknowledged multicast must also be supported, although the standard IP protocol does not support acknowledged multicast. System-wide broadcast is supported differently in IPv4 versus IPv6. In IPv4, there is only link broadcast, so to achieve a system wide broadcast, the routers must each do a link layer broadcast. In IPv6, a system wide broadcast is implemented as a group multicast for the network identified in the network prefix of the address hierarchy. One object of this invention is to make these differences transparent to the application program.

Another characteristic of control protocols is that they must be deployed on inexpensive microcontrollers to be competitive. This makes the transmission and buffering of traditional, 1K byte and above IP packet frames difficult. So, message fragmentation techniques have been created to ameliorate this condition.

Innovation in low cost links that can carry IP packets has produced cost effective links that are low bandwidth, thus requiring compression of the IP packet headers to conserve that limited bandwidth. Additionally, sending long packets over the lower bit rate links traditionally used in control system can introduce unacceptable delays. A set of RFCs developed by the IETF for low power wireless radios introduced a IPv6 header compression technique, but the technique is specific to links running the IEEE 802.15.4 MAC protocol, and therefore not suitable for all potential links.

Moving to Internet protocols also opens the threat of cyber-attacks, as IP is a protocol that is continually attacked. Providing robust encryption and authentication on a control protocol using multicast across multiple links is not something supported by IP. So, key agreement protocols must provide a symmetric key for multicast messaging rather than the IETF standard of point-to-point communications with hop-by-hop encryption at the link layer.

Finally, control systems once deployed, are in place for many years so additions to them should be backward compatible.

RFC 6282 and others associated with 6LoWPAN provide a standard means to compress IPv6 packets onto a wireless low power (and therefore short range), relatively high error rate, bandwidth limited, and message length limited link that uses the IEEE 802.15.4 MAC protocol. Links that do not use this MAC protocol are not covered by the RFCs. If the network is an IPv4 network, then the techniques in the RFC do not apply. Although the USA did run out of IPv4 addresses back on Apr. 15, 2013, IPv4 networks will be in service for many years due to protocols such as NAT and CIDR. So, embodiments detailed herein are designed to work with IPv4 networks as well as IPv6 networks and even allow mixed networks, for example, adding an IPv6 link to an IPv4 system.

A common, compressible IP address architecture that can be used on any link is described herein. This can then bring the benefits of compressed IP headers to links that are low bandwidth but do not use the IEEE 802.1.5.4 MAC protocol, and can unify an architecture across multiple links that support header compression along with those that do not. Thus, it allows nodes on a compressed link to typically communicate with nodes on a different link (compressed or not) to enjoy the benefits of IP header compression for both the source and destination IP addresses. In the prior, 6LoWPAN technology, when a node on the 802.15.4 link needs to communicate with a node on another link, then either an uncompressed IPv6 address must be put into the packet header thus consuming more link bandwidth, or an abbreviated address, assigned through some other means by a border router must be used and then the real address substituted at the border router, thus adding delay in the packet transit across the border router.

To facilitate internetworking with ISO/IEC 14908-1 based networks, IPv6 addresses are compressed into ISO/IEC 14908-1 addresses, and use leading zero suppression to compress the headers. For IPv4 based systems, the least significant two bytes of the IPv4 address are used as an ISO/IEC 14908-1 subnet and node number. There is an illegal value for the subnet number (0) so a DHCP server is configured to not hand that number out. Similarly in ISO/IEC 14908-1, node numbers have a range of 0 to 127, so the DHCP server is configured to never hand out numbers in the range of 128-255.

ISO/IEC 14908-1 also has the notion of a network ID called a domain. This is the same semantically as the IPv6 network prefix. These are allocated such that leading zero suppression yields good compression. In the IPv4 world, a class B address is required, so the upper two bytes of the IPv4 address serve as the ISO/IEC 14908-1 domain address.

IP packets all have header information to designate the destination address as being either a unicast or a multicast address. So, multicast addresses will be assigned starting from zero so that they can be easily compressed in the headers as well. In IPv4, multicast is simulated by using a link layer broadcast with a multicast IP address. In IPv6 one just uses a multicast IP address and no link layer broadcast is required.

Prior to delving into details regarding the use of IP addressing in control network a primer on communications. This discussion is applicable to control network communication devices ("CNCD") using a Control Network Protocol ("CNP") and communications over IP. An exemplary CNP is the ISO/IEC 14908-1 Control Network Protocol. This protocol is also known as ANSI/CEA 709.1 and EN 14908. There are many compatible implementations of the ISO/IEC 14908-1 protocol and its counter parts for physical layer (ISO/IEC 14908-2 and 14908-3) and Internet Protocol ("IP") tunneling standard (ISO/IEC 14908-4). However, other CNPs may be utilized.

CNPs are designed to support the needs of control applications spanning a range of industries and requirements. To meet its broad objectives, the protocols typically use a complete seven-layer communications protocol, with each layer optimized to the needs of control applications. The seven layers follow the reference model for open systems interconnection ("OSI") developed by the International Standard Organization ("ISO"). By addressing all seven layers defined by the OSI reference model, CNPs provide a robust communications solution that meets the needs of a broad range of applications today, and will continue to meet the needs of evolving control applications in the future.

The network layer defines how message packets are routed from a source device to one or more destination devices. This layer defines naming and addressing of devices to ensure the correct delivery of packets. Messages can be addressed to a single device, to any group of devices, or to all devices. Group addressing reduces network traffic and latency by supporting the delivery of a single message packet to multiple devices.

This layer also defines how messages are routed between the source and destination devices when these devices are on different communication channels. Addresses are formed using a hierarchical structure that supports the use of routers that filter messages based on their destination address. By supporting routers at the network layer, CNP supports the installation of very large systems with thousands of devices. Routers use the network layer to confine traffic to segments within a large network, thereby increasing total capacity of the network.

A name is an identifier that uniquely identifies a single object within an object class. A name is a physical address that is allocated when an object is created (manufactured) and does not change over its lifetime. In IPv4 and IPv6, the unique identifier is a media access control ("MAC") address. A CNP device includes a unique node ID. In some embodiments, the name is 48-bit ID called the CNP ID.

An address is an identifier that uniquely identifies an object or group of objects within an object class. Unlike a name, an address may be assigned and changed any time after an object is created.

CNP addresses uniquely identify the source device and destination device (or devices) of a CNP packet. These addresses are also used by intelligent routers to selectively pass packets between two channels. A CNP ID may be used as an address in CNP and in IPv6 the MAC address can be turned into a routable IP address.

To simplify routing, in some embodiments CNP defines a hierarchical form of addressing using three address components: the domain, subnet, and node addresses. This form of addressing can be used to address an individual device or collections of devices sharing common subnet or domain address components. To further facilitate the addressing of multiple dispersed devices, CNP defines another class of addresses using domain and group addresses.

The use of a dynamically assigned address instead of a fixed name simplifies replacement of devices in a functioning network. The replacement device is assigned the same address as the device it replaces. Thus, all references to this device from elsewhere on the network do not need to be modified, as would be the case if CNP ID addressing were to be used. The various address forms are described in the following sections, along with discussions on routers and address generation.

A domain is a logical collection of devices on one or more channels. Communications can only take place among devices configured in a common domain; therefore, a domain forms a virtual network. Multiple domains can occupy the same channels, so domains may be used to prevent interference between devices in different networks.

For example, two adjacent buildings using devices with power line transceivers on the same frequency may be on the same channel. To prevent interference between the applications carried out by the devices, the devices in each building would be configured to belong to different domains.

A CNP core may be configured so that it belongs to one or two domains. A device that is a member of two domains may be used as a gateway between the two domains. CNP does not support communications between domains, but an application program may be implemented to forward packets between two domains.

A domain is identified by a domain ID. In some embodiments, the domain ID may be configured as 0, 1, 3, or 6 bytes. Six byte domain IDs can be used to ensure that the domain ID is unique: for example, using the 48-bit CNP ID of one of the PLD cores in the domain as the domain ID ensures that no other network can have the same domain ID. However, six byte domain IDs add six bytes of overhead to every packet. The overhead may be reduced by using a shorter domain ID. In a system where there is no possibility of interference between multiple networks, the domain ID may be configured as 1 byte. Domain IDs may be configured as 1 or 3 bytes in systems where a single administrator controls assignment of domain IDs to prevent duplicate IDs.

The domain ID can also be used for application-level purposes. For example, a domain ID could be used by service personnel as a system identifier.

A subnet is a logical collection of up to 127 devices within a domain. Up to 255 subnets can be defined within a single domain. All devices in a subnet must be on the same segment (subnets cannot cross intelligent routers).

Every device within a subnet is assigned a unique node ID within that subnet. In some embodiments, the node ID is 7 bits, so there may be up to 127 devices per subnet. A maximum of 32,385 devices (255 subnets×127 devices per subnet) may be in a single domain.

Each configured device can be uniquely identified using its combination of domain ID, subnet ID, and node ID.

A group is a logical collection of devices within a domain. Unlike a subnet, however, devices are grouped together without regard for their physical location in the domain. Groups are an efficient way to use network bandwidth for messages addressed to multiple devices (that is, one-to-many connections).

Each CNP device contains an address table that contains addressing information that can be managed by a network management tool in a managed network, or by the CNP implementation on the device in a self-installed network. A CNP application can specify an address for an outgoing message by referencing an entry in the address table. This type of address is called an implicit address. Alternatively, a CNP application can specify the full layer-3 address for an outgoing message. This type of address is called an explicit address.

The advantage of implicit addressing is that it eliminates the requirement for a CNP application to manage destination addresses. It also allows different addressing schemes to be employed at lower layers without the applications knowledge, as long as the communication services are consistent across all addressing schemes (for example, confirmed unicast and multicast messaging, priority messaging, duplicate message detection, security, etc.). Layer-3 addresses are typically allocated and managed by the network management tool in a managed network or the self-installation engine in a self-installed network. The CNP application can send a message using a fixed index into the address table rather than attempting to determine the full layer-3 address for each message.

The address table also specifies the groups that the CNP device belongs to. When an incoming group-addressed message is received, the CNP implementation searches the address table for a matching group ID. As a result, the number of entries in the address table for a CNP device is the upper limit on the number of groups that the device may be a member of. The limit is reduced by the number of non-group implicit addresses stored in the address table.

FIG. 1 illustrates of an exemplary network of devices that are capable of communicating with each other using Internet Protocol ("IP") addressing. As illustrated, several different types of devices may communicate with each other including with powerline communication devices. For example, a computer (such as a personal computer, server, etc.) 103 can communicate to a power line device 113, an Institute of Electrical and Electronics Engineers ("IEEE") 802.11X standard device 109 (sometimes called a Wi-Fi device), a low-rate wireless personal area network (LR-WPAN) 117, etc. Exemplary LR-WPAN standards include IEEE 802.15.4, ZigBee, ISA100.11a, 6LoWPAN, etc. Similarly, each of the devices illustrated as belonging to the control network IP backbone can communicate with each other. Of course, this is merely an exemplary network and different number of nodes may be present and/or types of nodes and corresponding routers absent.

Unfortunately, using traditional IP addressing may pose issues with inter-device communication. For example, communicating between a powerline communication device 113 using a powerline communication standard such as the ISO/IEC 14908 standard (and equivalents) and a computer 103 that is using IPv4 is not natively possible. Detailed below are embodiments of systems, methods, and apparatuses that overcome these issues using CNP over IP (sometimes referred to as "CIP" below). In some embodiments, CIP uses UDP/IP messages to send CNP packets. However, other messages such as TCP/IP messages may be used. In the discussion that follows, messages between devices utilize User Datagram Protocol ("UDP") ports. Additional layers may provide additional services such as reliable multi-cast, network variables and security.

The Wi-Fi node 109 is coupled to a Wi-Fi router 107. Typically, the IP address of a Wi-Fi device 109 is directly mapped from the CNP address. Wi-Fi devices should be able to communicate directly with each other and other IP devices on a native IP link without the benefit of a border router such as 107. Therefore, Wi-Fi devices should support sending and receiving packets from devices that use arbitrary IP addresses.

Coupled to the powerline communication device 113 is a CIP router 111 that routes packets between a native IP link (such as Ethernet or Wi-Fi) and a native CNP link (which is a physical layer 2 link). The CIP router 111 is configured with CNP addresses as well as subnet and group forwarding tables. In some embodiments, the CIP router 111 provides DHCP services.

In some embodiments, the CIP router 111 supports one or more modes such as: 1) communication with other PLD 113 using existing CNP protocols such as ISO/IEC 14908-1; 2) communication using non-UDP packets; and 3) communication using compressed IP packets or arbitrary UDP messages. In addition to routing, the CIP router 111 inflates packets into UDP/IP messages as necessary which will be described below.

Coupled to the 802.15.4 node 117 is a CIP router 115 that routes packets between a native IP link (such as Ethernet or Wi-Fi) and a link using 6LowPan compression (such as 802.15.4). It is similar in function to a CIP router 111, with the following differences: 6LowPan is used for compression rather than CNP and the router supports conversion between IPV6 (on the 6LowPan link) and IPV4 (on the native IP link) to allow interoperability between devices on a 6LowPan link and CIP using IPV4. It is the responsibility of this router to: expand and compress packets, support CNP devices using arbitrary IP addresses, and convert between IPV4 and IPV6 if necessary It some embodiments, it is possible to use an off-the-shelf 6LowPan border router (that is not CIP aware) in an IPv6 system. In that case each device on the 6LowPan channel must support arbitrary IP addresses since they do not have CIP aware border router to implement that function for them.

In some embodiments, a DHCP server 101 is used to assign addresses to at least some of the devices in the network such as computer 103. These types of address are examples of "arbitrary" addresses in this description. An arbitrary address is an IP address that is not derived from a CNP address. As will be discussed below, some CIP devices cannot use IP addresses derived from the CNP address. When sending a message to a device with an arbitrary IP address the destination CNP address is explicitly included in the packet. Likewise when sending a packet from a device that uses arbitrary IP addresses the source CNP address is explicitly included in the packet.

Another utilized address type is called a "derived" address, which is an IP address that is derived from a CNP address. All CIP devices have CNP addresses and IP addresses. Most CIP devices use IP addresses that are derived from their CNP addresses. CNP derived IP addresses can also be transformed back into CNP addresses. Because of this bi-directional transformation the CNP address and the CNP derived IP address can be thought of as different formats of the same address.

Unicast IP addresses used by CIP devices are typically derived from CNP addresses. In addition, CIP uses multicast addressing. The IP infrastructure should be configured to properly route both the unicast and multicast addresses used by CIP. For example, configuration of firewalls to pass CIP UDP packets may be required. Or, when connecting over the Internet the use of a virtual private network ("VPN") 105 may be used for security and IP management purposes.

In this illustration, the computer 103 is a PC that gets an arbitrary IP address assigned by a DHCP server.

Figure 2:
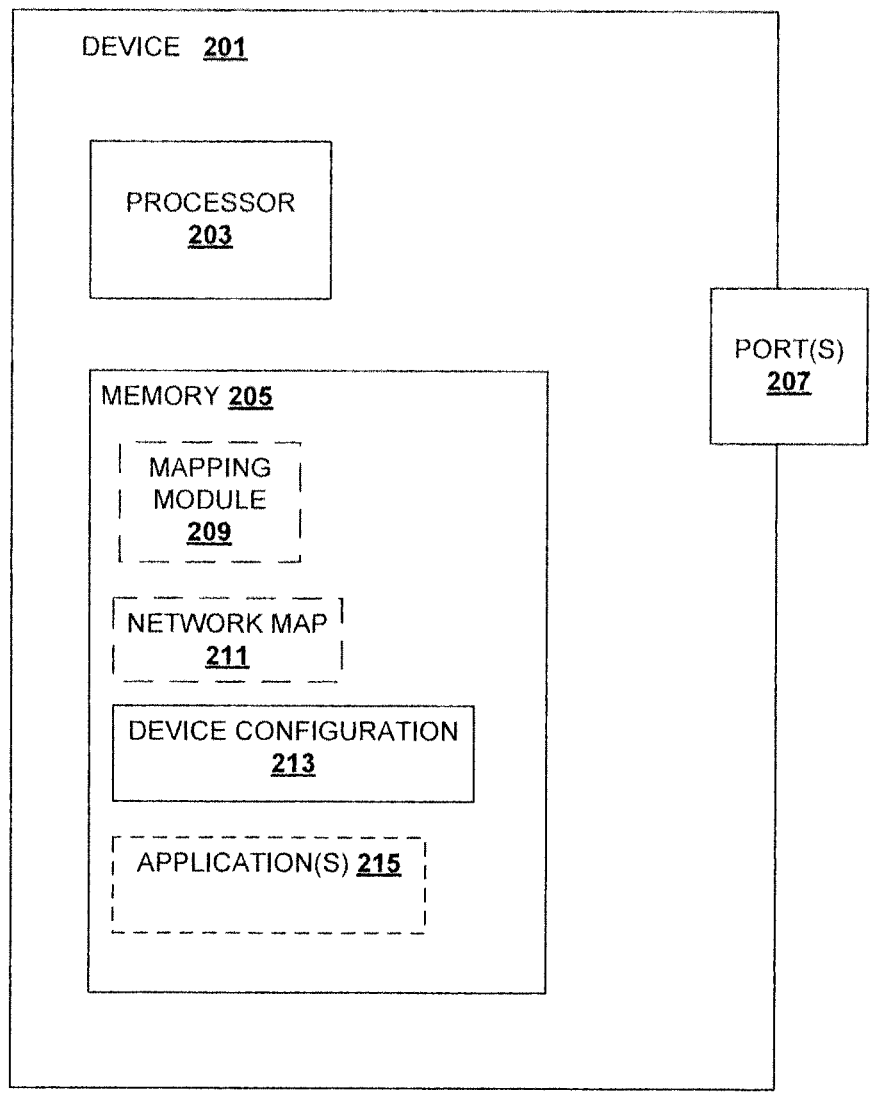
FIG. 2 illustrates an exemplary embodiment of a CNP device in a network.

FIG. 2 illustrates an exemplary embodiment of a CNP device in a network. The device 201 includes a processor 203 such a central processing unit ("CPU"), microcontroller, etc. to execute one or more routines (such as applications 215 or the mapping module 209) stored in memory 205. The device 201 communicates with other networked devices through one or more physical ports 207. These ports 207 map to one or more virtual ports such as to a particular UDP port.

In some embodiments, the device 201 includes a mapping module 209 to map between different addressing schemes. For example, an outgoing message coming through port 207 is processed by the mapping module 209 using the network map 211 such that is formatted to reach the recipient or an intermediary that will forward the message to the intended recipient such as a router like routers 111, 107, and 115. In some embodiments, devices that include a mapping module are Wi-Fi devices. An example of what is contained in the network map 211 was detailed earlier. In some embodiments, the mapping module 209 is unnecessary as that functionality is provided by a corresponding router. For example, powerline communication devices and 802.15.4 devices do not typically have a mapping module 209. In some embodiments, the mapping module 209 is a hardware component.

Figure 3:
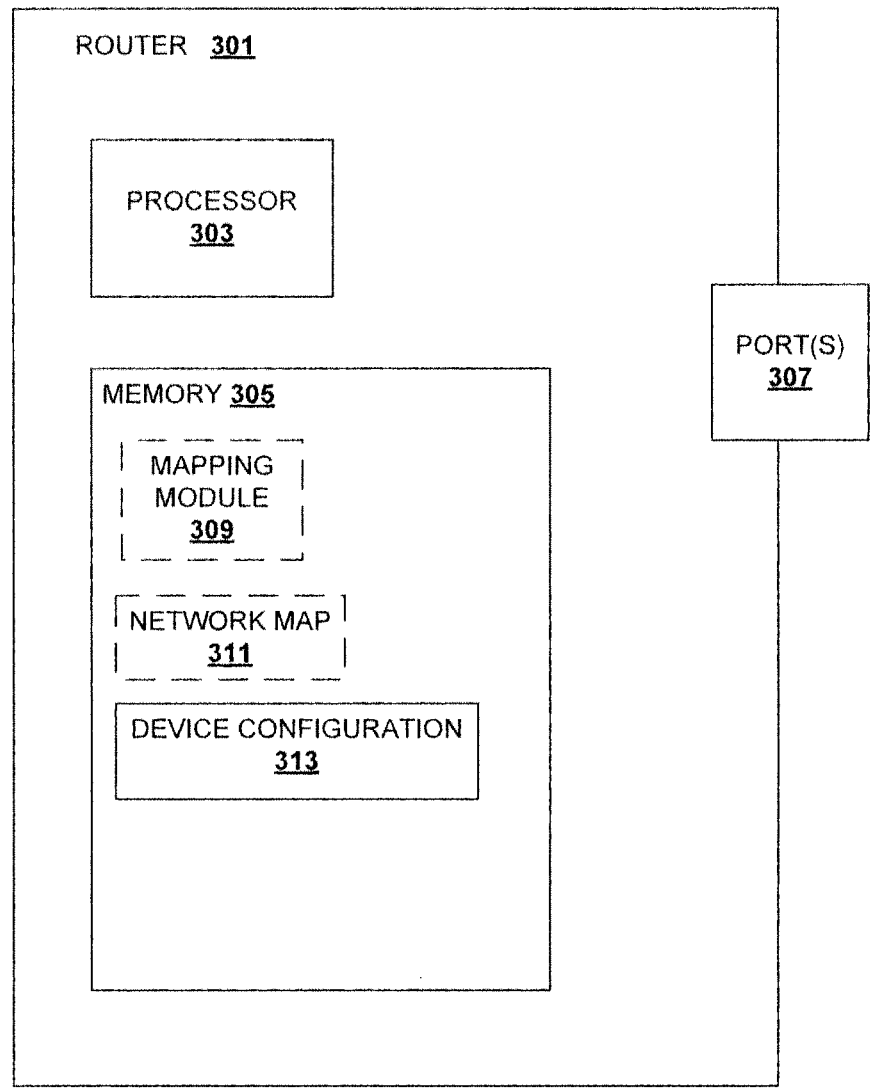
FIG. 3 illustrates an exemplary embodiment of a router in a network.

FIG. 3 illustrates an exemplary embodiment of a router in a network. The router 301 includes a processor 303 such a central processing unit ("CPU"), microcontroller, etc. to execute one or more routines (such as the mapping module 309) stored in memory 305. The router 301 communicates with other networked routers through one or more physical ports 307. These ports 307 map to one or more virtual ports such as to a particular UDP port.

In some embodiments, the router 301 includes a mapping module 309 to map between different addressing schemes. For example, an outgoing message coming through port 307 is processed by the mapping module 309 using the network map 311 such that is formatted to reach the recipient or an intermediary that will forward the message to the intended recipient such as a router like routers 111, 107, and 115 or nodes such as powerline communication devices, Wi-Fi devices, 802.15.4 devices, etc. In some embodiments, routers that include a mapping module are powerline communication routers and 802.15.4 routers. An example of what is contained in the network map 311 was detailed earlier. In some embodiments, the mapping module 309 is unnecessary as that functionality is provided by a corresponding device. For example, Wi-Fi routers do not typically have a mapping module 309. In some embodiments, the mapping module 309 is a hardware component.

In the network above, all of the CNP devices support CNP addresses. CIP devices also have IP addresses. Typically the IP address is the same as the CNP address (albeit in a different format). Thus, the CNP address used by the upper layers of the CNP protocol can be seamlessly inflated to an IP address, and upon receipt the IP address can be seamlessly deflated into a CNP address.

However, some devices use IP addresses that cannot be compressed into CNP addresses. For example a device that supports multiple logical CNP devices but has only one IP address has a many to one relationship between CNP and IP addresses. Other devices may be constrained to use a particular IP address that is not related to the CNP network. For example, a PC in an environment that is not dedicated to a CNP network may be required to use DHCP for its IP address, gateway configuration, etc.

Detailed herein are examples of addressing between different devices in the above exemplary network. When a packet is sent from a powerline communication device to an 802.15.4 device both the source and destination devices use CNP derived IP addresses, and so only context free link layer compression and inflation is required. Compression is a process of creating a CNP address from a CNP derived IP address. Inflation is the process of creating an IP address from a CNP address.

When a Wi-Fi device sends a message to a computer, the packet starts out using a CNP address. The CIP mapping module in the Wi-Fi device map both the source and destination CNP addresses to arbitrary IP addresses. When the packet is received by the PC and the CNP addresses are extracted from the UDP payload and they are sent to a program on the PC. The PC also learns the IP address associated with the source CNP address in the process.

When an 802.15.4 device sends a packet to a logical device running on a computer such as a Raspberry Pi device, the 802.15.4 device sends the packet using CNP derived IP addressing (compressed using 6LowPan). The CIP mapping module in the border router determines that the IP address associated with this CNP address is arbitrary. The packet is sent to the Raspberry Pi device with the destination CNP address in the UDP payload. The packet it received by the Raspberry Pi device and the CNP addresses are extracted from the UDP payload and sent to the logical device or the Raspberry Pi device. The Raspberry Pi device also learns the IP address associated with the source CNP address in the process.

FIGS. 4(A) and (B) illustrate examples of using a mapping module (or layer or logic) to map CNP addresses to (possibly) arbitrary IP addresses. In FIG. 4(A), the CIP mapping logic 413 is used to map CNP addresses to (possibly) arbitrary IP addresses. This logic determines if mapping is required and if not it can simply reformat the address. When mapping is necessary the logic 413 finds the appropriate IP address from its stored addressing table or database (not shown). In this example, the computer 401 is using an arbitrary address and application 405 running on that computer 401 wants to send a message to a CNP device through its border router 403.

When the application 405 sends a message to the CNP device the application 405 forms a CNP packet using its source CNP address 407 and the destination device's CNP address 409 as the destination with a payload 411. The mapping logic 413 detects that the source device's CNP address 415 does not map to an IP address on the computer 401 and it embeds the source CNP address 407 in the UDP payload of the UDP packet 425. The destination IP address is the destination device's CNP address 409 reformatted as a destination IP address 417. The IP addresses, while normally stored in a table, may need to be formed at least once prior to being stored in the table as discussed below.

The UDP packet 425 is received by the border router 403, which reformats the destination address 417 to the corresponding CNP address 409 and extracts the source CNP address 407 from the UDP payload 421 using mapping logic 421. It also updates its mapping logic 421 to map the source CNP address 407 to the source IP address 415. The border router 403 forwards the packet the CNP addressed device.

Figure 4B:
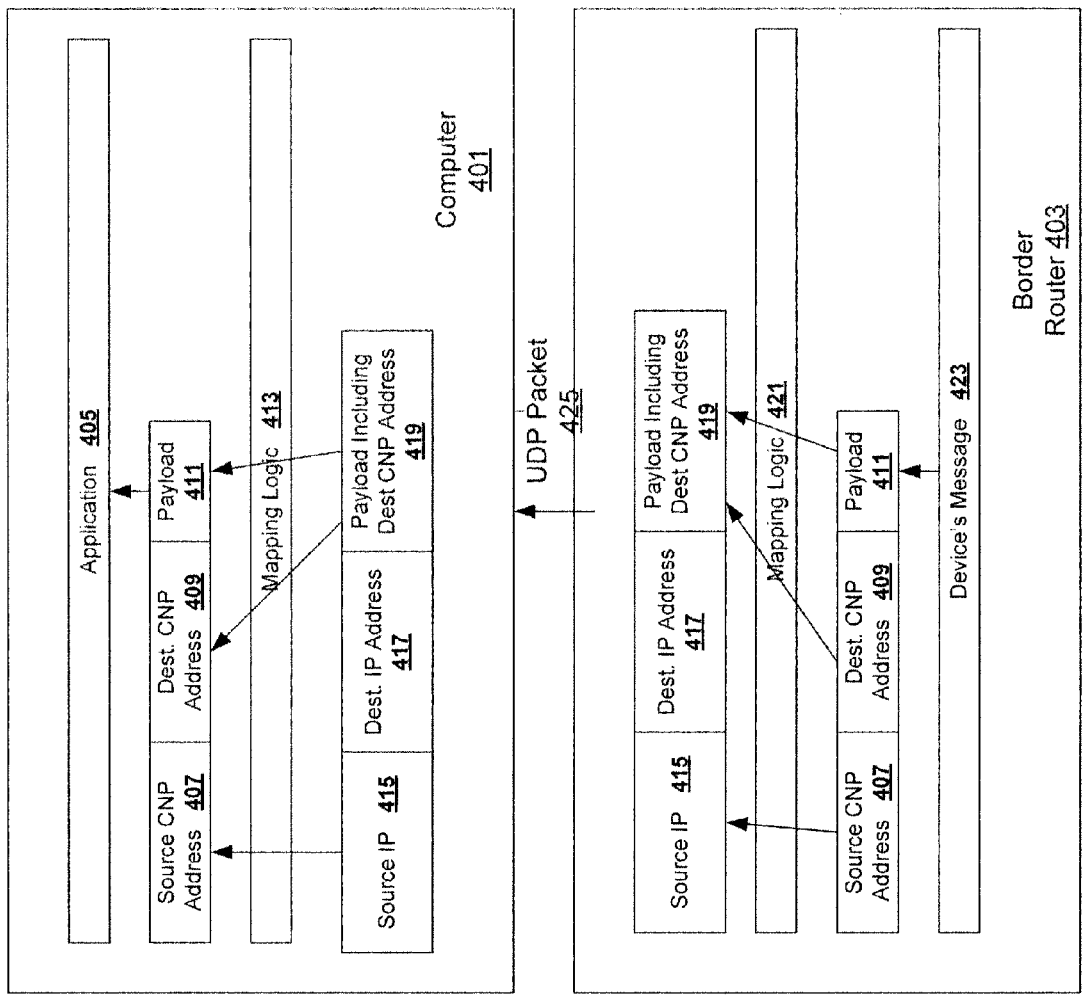
FIGS. 4(A) and (B) illustrate examples of using a mapping module (or layer or logic) to map CNP addresses to (possibly) arbitrary IP addresses.

In FIG. 4(B), the CIP mapping logic 413 is used by a device using compressable addressing. For example, the device 403 may be a powerline communication device, 802.15.4 device, or router. The device 403 sends a packet 423 using its CNP source address 407 and the CNP destination address of the application 409. The packet is received by the border router 403 that determines, based on the CNP destination address of the application 409 that the message will be forwarded onto the Ethernet link. The mapping logic 421 looks in its mapping table(s) and finds that destination CNP address 409 corresponds to an arbitrary IP address 417. It reformats the source CNP address 407 to a source IP address 415, and sets the destination IP address to the arbitrary IP address 417 found in its mapping table. The router also copies the destination CNP address 409 to the UDP payload 419, and sends the message 425.

The computer 401 receives the message and reformats the source IP address 415 to a source CNP address 407, extracts the destination CNP address 409 from the UDP payload 419, and forwards the CNP message to the application 405.

As described above, the mapping logic (module or layer) must maintain tables used to map CNP addresses to arbitrary IP addresses. For each CNP address, the CIP mapping entry can be in one of three states: 1) unknown—it is not known whether the CNP address is associated with a derived or arbitrary IP address (this is typically the initial state for all CNP addresses); 2) the CNP address is associated with a derived IP address; and 3) the CNP address is associated with an arbitrary IP address. The associated arbitrary IP address is stored in the table.

Figure 5:
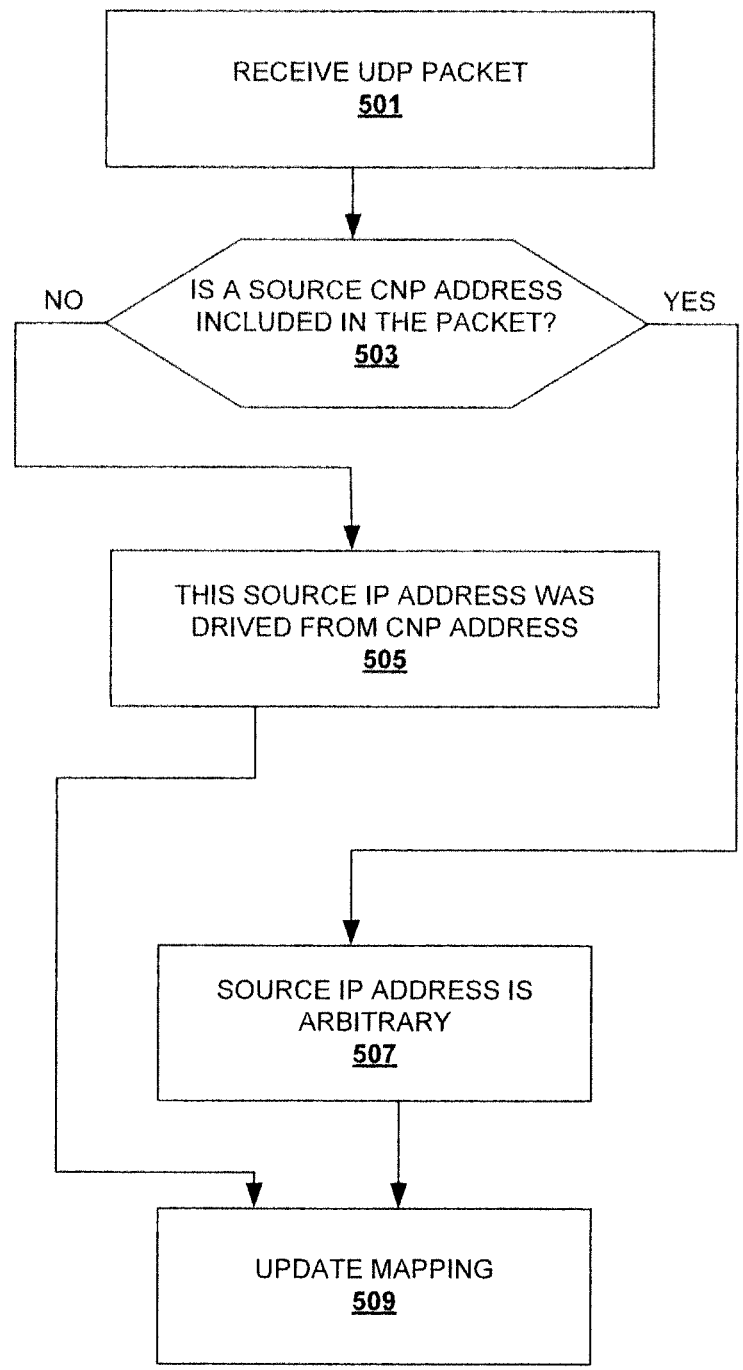
FIG. 5 illustrates an embodiment of a method for a processor to execute to update or maintain a mapping table upon packet receipt.

FIG. 5 illustrates an embodiment of a method for a processor to execute to update or maintain a mapping table upon packet receipt. At 501, a UDP CIP packet is received by a mapping module. A determination of if this packet includes a source CNP address is made at 503. For example, does the UDP packet include a source CNP address in its payload. If the source CNP address is omitted from the UDP payload then the source IP address was derived from the source CNP address as noted in 505. The table is updated accordingly at 509. Whenever a CIP packet is received and the CNP address is explicitly defined in the UDP payload, then the source IP address is arbitrary as noted in 505. This is the scenario detailed earlier with respect to FIG. 4. The mapping table is updated to store the mapping from source CNP address to source IP address at 509.

Using this mechanism alone means that the CIP mapping tables can be learned whenever a packet (including an acknowledgement or response) is received. However, if only unacknowledged or unacknowledged repeated messages are sent to a device, the mapping might never be learned, and thus multicast messaging might always be used. To address this concern the receiving device may optionally send an unacknowledged message to the sender whenever it receives an unacknowledged or repeated message sent using CNP subnet/node addressing mode but that uses a multicast address. Alternatively, this operation may be performed by a border router. In some embodiments, routers announce that all devices on a particular subnet or subnets use CNP derived IP addresses. Additionally, in some embodiments, configuration of CIP mapping tables is supported.

Figure 6:
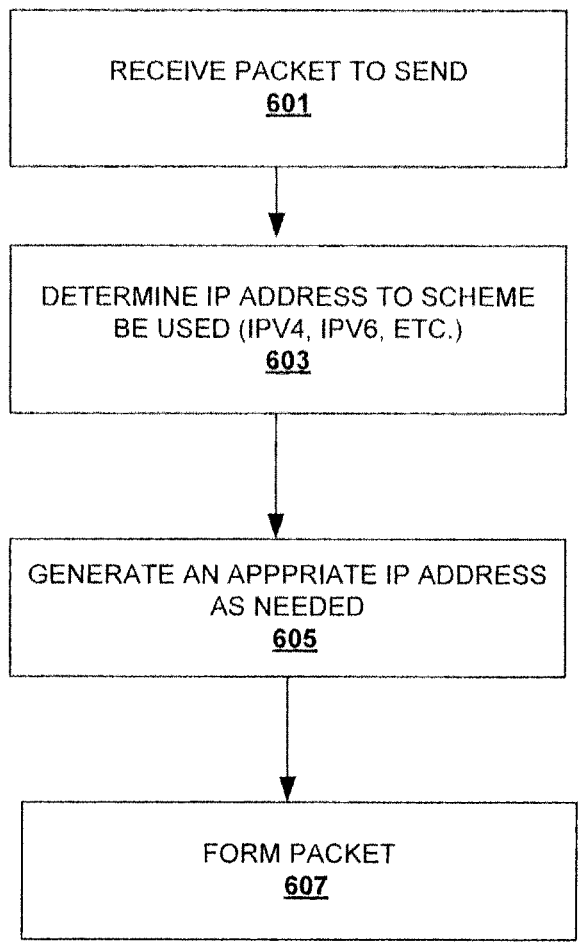
FIG. 6 illustrates an high-level embodiment of a method for forming a UDP packet to send.

Whenever CNP packet is sent, mapping logic looks in the mapping tables to map the CNP address to the appropriate IP address. FIG. 6 illustrates an high-level embodiment of a method for forming a UDP packet to send. At 601 a packet to send is received by the mapping logic.

At 603, the IP addressing scheme (IPv4 or IPv6) to be used is determined. This is based on the receiving device. Additionally, the type of IP addressing to be used (unicast, multicast, etc.) is determined.

At 605, as needed, an IP address is created based on the received packet. For example, a source CNP address may need to be remade into a source IP address or a destination CNP address may be made into a destination IP address. This may already be stored in a mapping table.

At 607, a UDP packet is formed. This packet includes a source IP, destination IP, and a payload that includes either a source CNP address or a destination CNP address. One or more of the source and destination IPs may be calculated or retrieved from a mapping table as needed. The formed packet is then sent.

Figure 7:
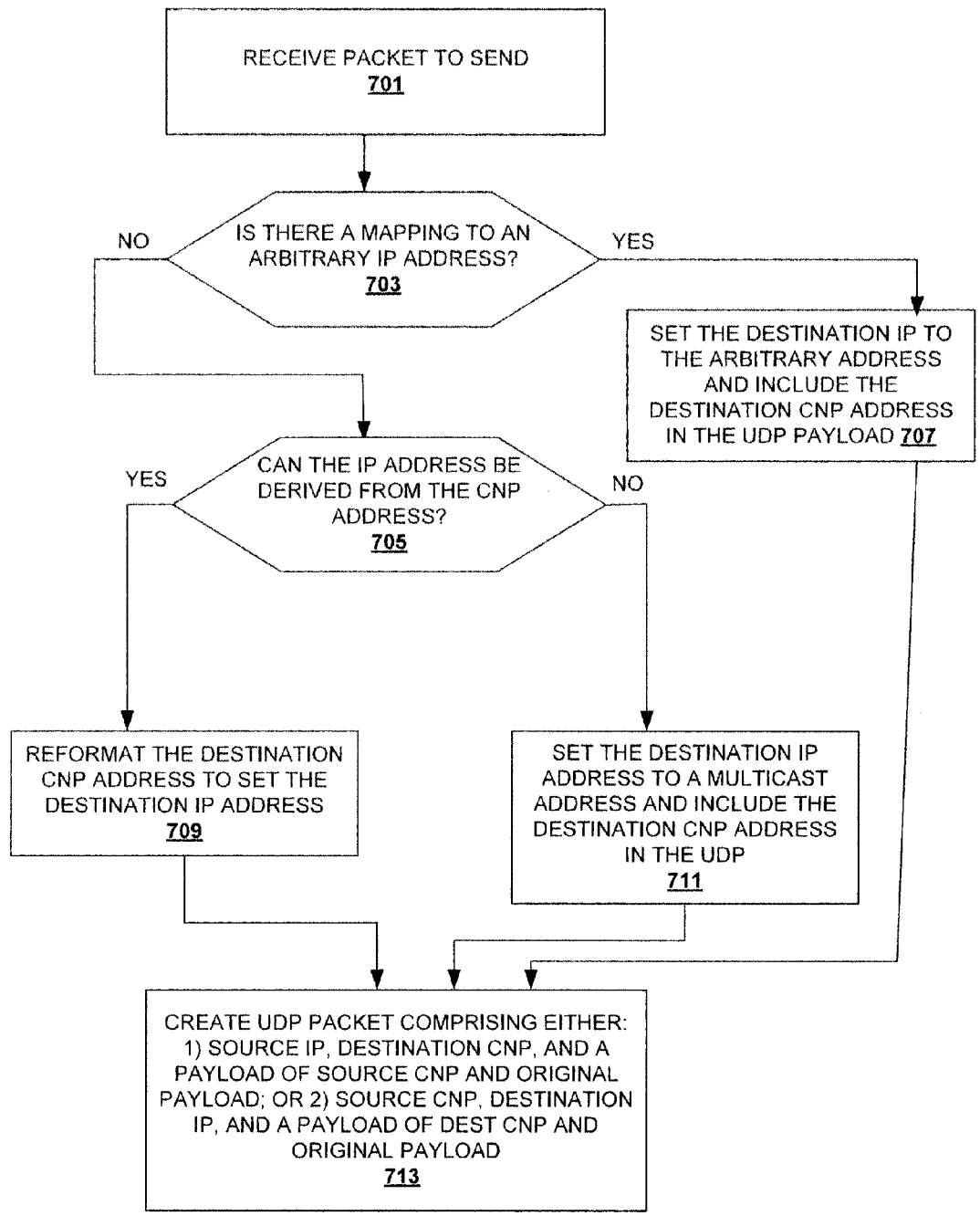
FIG. 7 illustrates an embodiment of a method for a processor to execute to use a mapping table when sending a packet.

FIG. 7 illustrates an embodiment of a method for a processor to execute to use a mapping table when sending a packet. At 701 a packet to send is received by the mapping logic. A determination of if there is a mapping to an arbitrary IP address is made at 703. This is done by the mapping logic.

If there is a mapping from the CNP address to an arbitrary IP address, the destination is set to that arbitrary address and the destination CNP is included in the UDP packet at 707.

If there is not a mapping, a determination of if an IP address can be derived from the CNP address is made at 705. Examples of derivation will be detailed later. If an address can be derived from the CNP address, the destination CNP address is reformatted to set the destination IP address at

709. Otherwise the destination address is set to a multicast address and the destination address is included in the UDP payload at 709. The multicast address used should be the well-known multicast address for the destination subnet. A formed UDP packet is created at 713 that comprises, depending upon the sender: 1) a source IP of the sender, destination CNP, and a payload of the source CNP and original packet payload or 2) a source CNP, destination IP, and a payload of the destination CNP and original payload.

In some instances, a device may have a single physical interface (and therefore a single unique identifier such as a MAC address or CNP ID) and support multiple applications. There are a few ways to support talking to those applications. In some embodiments, multiple IP addresses are supported. For example, in some embodiments, this is supported through a software stack wherein each logical device has its own address. Typically, the device will have a derived IP address for each application addresses. If this approach is not possible or practical, a device can use a single arbitrary IP address and encode the unique identifier of the application in the packet's payload. This encoded identifier can then be used to forward the packet's contents to the appropriate application.

Figure 8:
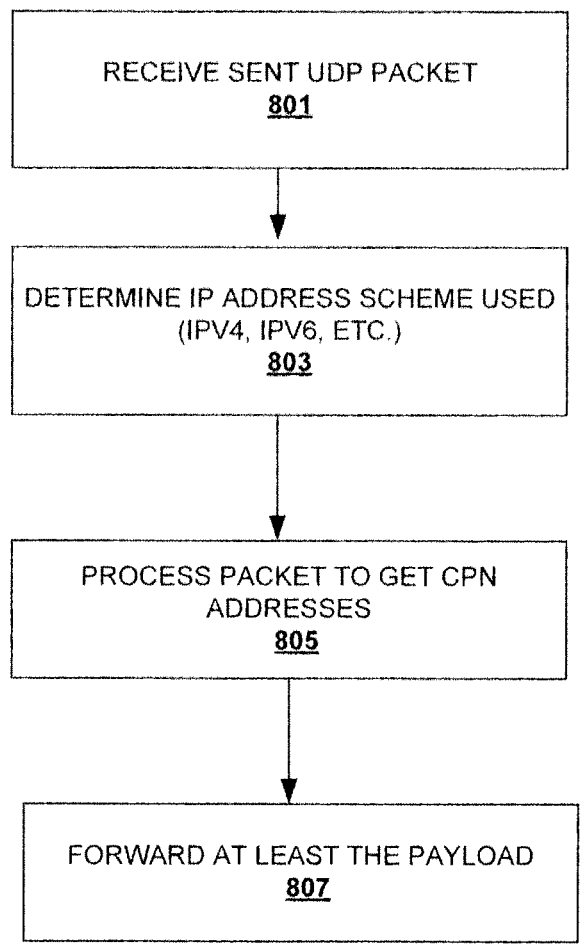
FIG. 8 illustrates a method of processing a received UDP packet.

FIG. 8 illustrates a method of processing a received UDP packet. At 801 a UDP packet is received over a port. This packet is forwarded to mapping logic for further processing. A first determination is what type of addressing scheme was used at 803. For example, was IPv4 unicast or multicast used, or IPv6 unicast car multicast used, etc. There may be additional subsets within those categories as is discussed below. Determining the difference between IPv4 and INC; is straightforward based on the version field in the IP header.

An appropriate IP address is processed by the mapping logic 805 to extract CNP address(es). The IP address may have been derived from a CNP address or be an arbitrary IP address. A destination CNP may be encoded in the destination IP address of the packet or in the UDP payload. An example of how CNP affects how the source and destination CNP are obtained from the received packet are detailed in Table 2 below.

TABLE 2

| Source uses CNP derived address | Destination uses CNP derived address | How is the source CNP address obtained? | How is the destination CNP address obtained? |
| --- | --- | --- | --- |
| Yes | Yes | Extracted from the source IP address. | Extracted from the destination IP address. |
| Yes | No | Extracted from the source IP address. | Included in the payload |
| No | Yes | Included in the payload | Extracted from the destination IP address. |
| No | No | Included in the payload | Included in the payload |

If a device using CNP derived addressing sent a packet, the source IP address in the packet is used to extract out the CNP address. If a device using an arbitrary IP address sent the packet, the source CNP is pulled from the payload. In either case, if the destination device uses an IP address derived from its CNP address, the destination CNP address is extracted from the destination IP address, otherwise the destination CNP is pulled from the payload of the UDP packet.

Finally, at least the original payload is sent to the receiving application at 807. Additional information (such as the sender) may also be sent.

Additionally, devices can change IP addresses over time, and if a device changes its IP address it is possible that the CIP mapping table may become stale. To avoid this situation, in some embodiments a device sends a domain wide broadcast message after changing its IP address. This will serve to synchronize CIP mapping tables. However, this message might be missed by one or more devices. Therefore the message should be sent on a periodic basis. This period is configurable, and announcement can be turned off. CIP mapping of arbitrary addresses will also be aged, with a configurable period.

For example, suppose a device "A" uses an arbitrary IP address "IP1", and then switches to a different IP address "IP2." This could happen because device "A" is a mobile device and has been moved. If another device "B" has already learned that "A" uses IP address "IP1," any messages sent from B to A will fail until this inconsistency has been corrected. The inconsistency can be corrected in one of the following ways: "A" announces its new IP address (using broadcast addressing); "A" sends a message to "B;" or due to aging the CIP mapping expires. At this point "B" forgets the mapping and the next message sent to "A" will learn about IP2.

Another form of inconsistency could arise if A uses a CNP derived IP address, B learns that fact, and then A switches to an arbitrary address. This would result in the same problem, and can be recovered in the same way. However, devices that support aging entries for arbitrary addresses might not do the same for entries for derived IP address.

CNP applications and services use CNP addresses to communicate with other CNP devices. Network managers may assign CNP service addresses to each device and use network management commands to store these addresses the devices. Network managers may also support peer-to-peer binding by configuring the address tables of sending devices with the subnet/node of the receiving device, or by adding both devices to a CNP group.

Most CIP devices will use CNP "derived" IP addresses. CNP Derived IP addresses are derived from CNP addresses, and there is direct, algorithmic method to compress a CNP Derived IP address to a legacy CNP address, and to expand a legacy CNP address to a CNP derived IP address. When using CNP derived IP addresses CIP devices use CNP addresses to form IPV4 or IPV6 addresses to send data, and upon receipt of a message translate both the source and destination IP addresses into their corresponding CNP addresses. CIP devices may use both unicast and multicast addressing.

Some devices use arbitrary IP addresses, for one or more of the following reasons: a single physical device with one IP address supports multiple logical CNP devices or the device cannot control the IP address assigned to it. For example, a PC using DHCP would use an arbitrary IP address. It is the responsibility of border routers to translate between CNP addresses and arbitrary addresses, as necessary.

The following descriptions detail derived CIP addresses in IPv4 and IPv6 to be used in a UDP packet as a source IP as needed. Once a UDP packet using these addresses is received, the proper CNP or application address can be retrieved. For example, in IPv4 unicast messages, the domain, subnet, and node IDs can be extracted from the address. In IPv4 multicast messages the CNP subnet or group ID can be extracted from the address. In IPv6 unicast using a CNP ID, the CNP domain, subnet, and CNP ID can be retrieved. In IPv6 unicast using subnet/node addressing, the CNP domain, subnet, and CNP ID can be retrieved. In IPv6 multicast addressing, the CNP domain ID, address type, and CNP subnet or group can be retrieved. Once the proper ultimate address of the destination is retrieved (calculated) from the address included in the received UDP packet, the payload can be forwarded accordingly.

In some embodiments, IPv4 unicast addressing is used only for CNP subnet/node addresses. The first two bytes of the IP address represent the CNP services domain ID, the third byte represents the CNP subnet, and the fourth byte represents the CNP node ID.

In some embodiments, CNP supports domain sizes of 0, 1, 3, and 6. However, CNP over IPv4 may not support 6 byte domains. In some embodiments, 3 byte domains are supported only if the third byte is 00. In at least one embodiment, CNP/IPv4 uses 192.168.x.x addresses to represent domain length zero and 10.x.x.x to represent 1 byte domain IDs. However, other configurations may be used. The mapping of IP address to CNP address is shown Table 2 below:

TABLE 2

| IP Address | Domain Length | Domain ID | Subnet ID | Node Id |
|---|---|---|---|---|
| 192.168.S.N | 0 | N/A | S | N |
| 10.D1.S.N | D1 | 1 | S | N |
| D1.D2.S.N | D1D200 | 3 | S | N |

The values for 'S' and 'N' should conform to CNP limitations, namely in some embodiments 'S' must be in the range 1-255 and 'N' must be in the range 1-127. Likewise the domain ID used should result in a valid IPv4 unicast address and not be in conflict with the IP addresses used for other domain lengths.

In some embodiments, prior to receiving a CNP address, a device configures itself with address 192.168.0.0, corresponding to the zero length domain with subnet and node set to 0. This default address should not be used as a destination address, but may be used as the source address when sending service pin messages and responses. If other default addresses are used they should not be used as a destination address either.

In at least one embodiment, on start up, a device looks to see if it has a CNP address, and if so the device sets its IP address based on the CNP address, otherwise the device it sets its IP address to the default (such as 192.168.0.0).

Figure 9:
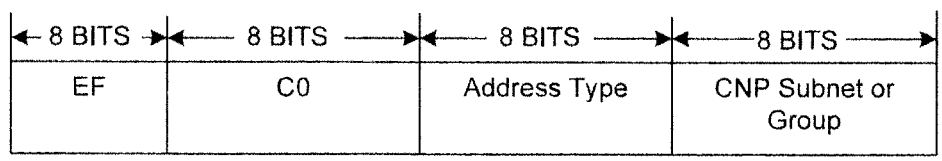
FIG. 9 illustrates an embodiment of IPv4 CIP multicast address formatting.

IPv4 multicast addresses are used for domain and subnet broadcast, groups and CNP ID addressing. An example of IPv4 CIP multicast address formatting is shown in FIG. 9. In some embodiments, the multi-cast address uses the range 239.192.0/0/14, corresponding to the IPv4 organization local scope multicast addresses.

The address type is interpreted as follows: 1) 0x00: Domain and or subnet broadcast. The least significant 8 bits is the CNP subnet ID, or 0 for domain broadcast. 2) 0x01: Group addressing. The least significant 8 bits is the CNP group ID. 3) Anything else is undefined. CNP ID addressed messages include the CNP ID in the UDP payload.

Some systems need valid IP addresses before they can be configured. CIP devices in these types of systems will use DHCP to obtain an IP address in some embodiments. The device takes the following steps to configure its IP and CNP address. On startup, the device sets its IP and CNP address as described above. Namely it looks to see if it has a CNP address, and if so, it derives its IP address based on the CNP address, otherwise the device it sets its IP address to 192.168.0.0.

Next the device sends a DHCP discovery message. If the device already has a valid IP address (not 192.168.0.0), the discovery message includes the option to request a specific IP address specifying its current IP address. So long as the current address is within the range supported by the DHCP server and not already allocated to another device, the DHCP server should send an offer with that same IP address.

Upon receipt of a DHCP offer, the device: sets its IP address to the offered address; sets its CNP address derived from the IP address; and If the device is not applicationless, sets its state to configured.

When the DHCP lease expires, the device sets its IP address back to default (such as 192.168.0.0) and clears its CNP address (setting an invalid bit in the domain length and setting subnet and node ID to 0). If the device is configured, it sets its state to unconfigured.

For performance reasons, the DHCP server should offer only addresses that map to valid CNP addresses. Specifically, in some embodiments, the 3rd byte of the IP address must be in the range 1-255, and the 4th byte must be in the range 1-127.

IPv6 unicast addresses consist of a routing prefix, a subnet ID, and an interface identifier (IID). The IPV6 routing prefix must be 48 bits, the IPv6 subnet ID must be 16 bits, and the IID must be 64 bits to be conforming.

In some embodiments, the CNP domain ID is 48 bits and is identical to the global routing prefix. Typically, CNP services support 2 types of unicast addressing, CNP ID and subnet node, which are described in the sections below.

The CNP service addressing format for CNP ID addressing includes a subnet ID. The subnet ID is not used by the device, but it is used by routers to determine whether the message should be routed or not. For example, a subnet ID of 0 may indicate that the message should be routed to all links.

If the subnet is known the CNP ID derived unicast address should be used. If the subnet is not known the CNP ID derived unicast address cannot be used because it includes the subnet ID. In such cases the multicast address defined for CNP domain wide broadcast must be used, the address format should be set to indicate this, and the CNP ID must be included in the UDP payload.

Figure 10:
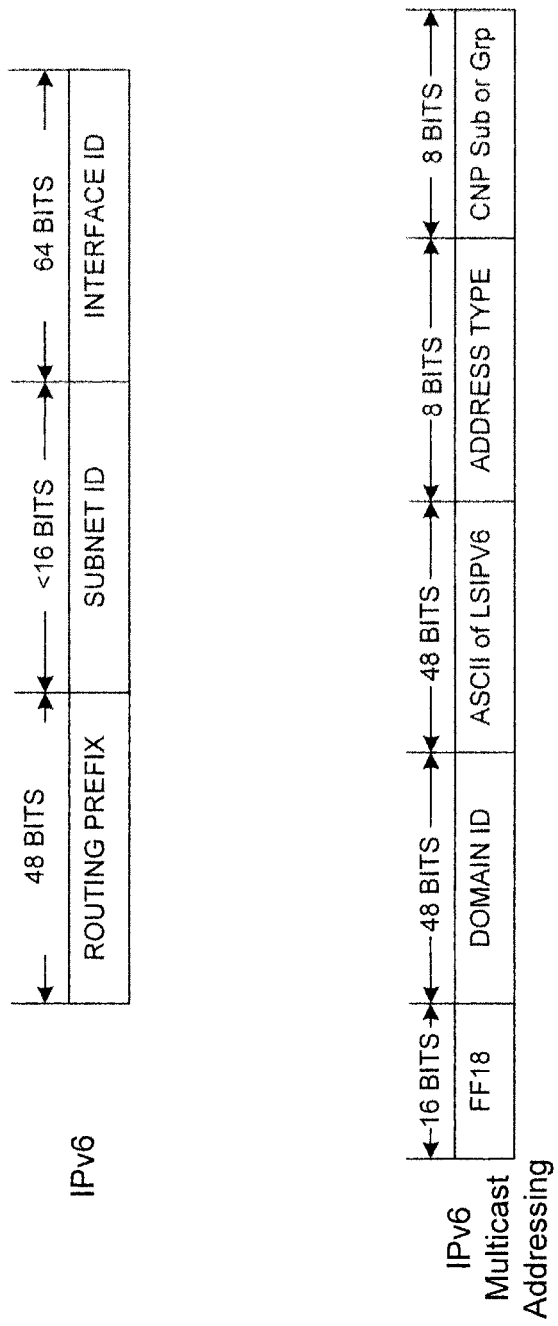
FIG. 10 illustrates an embodiment of a format of a CIP multicast address.

An embodiment of a format of a IPv6 CIP multicast address shown in FIG. 10. This format is the concatenation of: FF18 (multicast, transient, organizational scope), the CNP domain ID, an ASCII representation of "LSIPV6" (4C5349505636)," a 1 byte address type (0x00 or 0x01), and a 1 byte value representing the CNP subnet ID or CNP group ID.

In some embodiments, the address type is interpreted as follows:
0x00: Domain and or subnet broadcast. The least significant 8 bits is the CNP subnet ID, or 0 for domain broadcast.
0x01: Group addressing. The least significant 8 bits is the CNP group ID. Anything else: undefined Examples of IPv6 domain broadcast, subnet broadcast, and group broadcast are found in FIG. 11.

Figure 12:
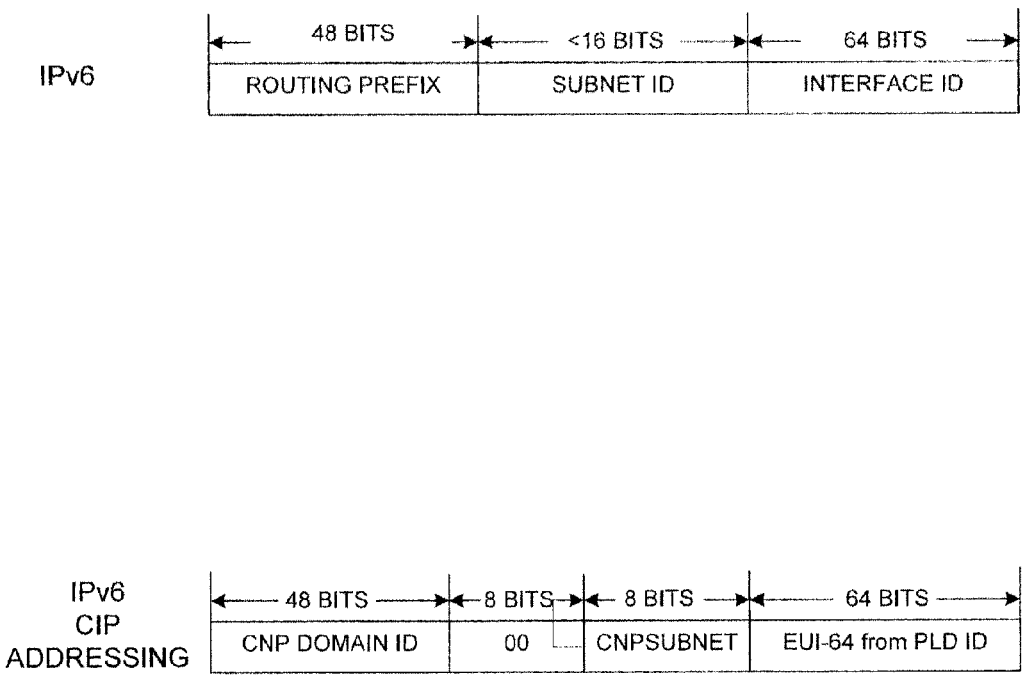
FIG. 12 illustrates an embodiment of IPV6 unicast addressing used for CNP ID addressing.

An embodiment of IPV6 unicast addressing used for CNP ID addressing is shown in FIG. 12. The IDD (lower 64 bits) is derived from the CNP ID in a manner similar to the way IDDs are formed from MAC IDs with the following exceptions: 1) the CNP ID does not have a u/I bit or a g bit like a MAC ID, but since the EIU-64 does have these bits, we take these two bits from the MSB of the neuron ID (which are always 0 in Echelon allocated CNP IDs) and shift remaining bits in that byte over by 6; and 2) The "u" bit is not flipped, because EUI-64 IDDs derived from a PLD might not be unique.

If the subnet ID is unknown, IPv6 unicast should not be used. Rather, the multicast broadcast address should be used and the CNP ID included in the UDP payload.

Figure 13:
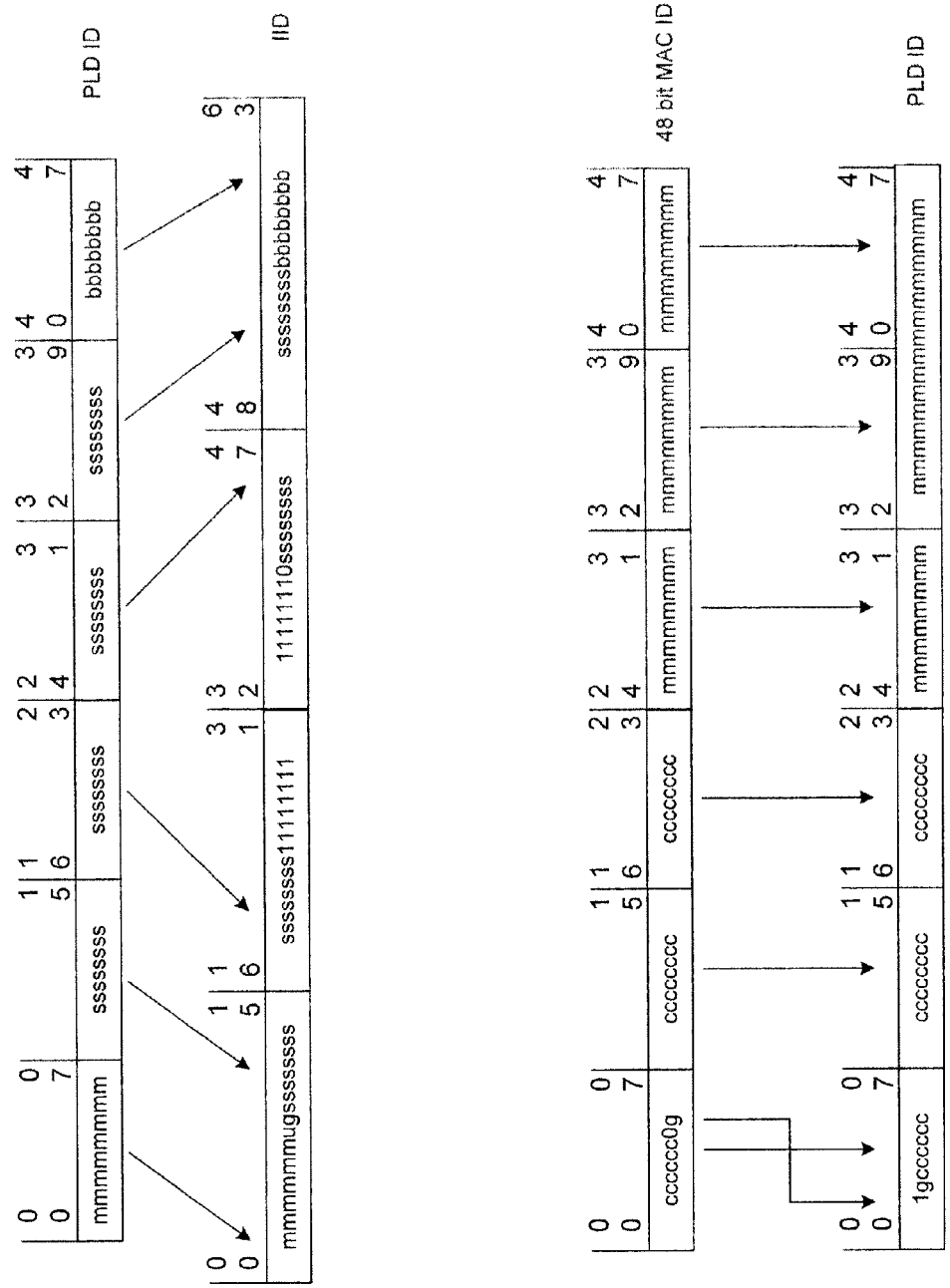
FIG. 13 illustrates embodiments of IDD generation.

The generation of an IDD from a CNP ID is shown in at the top of FIG. 13, where "m" means manufacturer, "s" means sequence number, "b" means bloc, "u" means universal and "g" means group.

By way of example, the CNP ID address for a device with a CNP ID of 07AABBCCDDEE, domain ID of 112233445566 and subnet ID of 77 would be 11223344556600771CAABBCCDDEE.

For devices that have MAC IDs but not CNP IDs, the CNP ID is generated from the MAC ID. Bytes 1-5 of the MAC ID are copied to the CNP ID. Byte 0 of the CNP ID is composed of the u & g bits from the MAC ID (bits 6 and 7), with the u bit flipped, bits 0-5 of the MAC ID are copied to bits 2-7 of the CNP ID. This is illustrated in the bottom half of FIG. 13.

Figure 14:
FIG. 14 illustrates embodiments of IPv6 subnet/node addressesing.

Embodiments of IPv6 subnet/node addresses use the format of FIG. 14. For example, the IPV6 address corresponding to a subnet/node address with domain ID 112233445566, subnet 0x11 and node ID 0x22 would be: 11223344556600110000000000000022.

When a CNP packet is sent to an arbitrary IP address, the CNP destination address must be included in the UDP payload. Likewise, if a CNP packet is sent from a device with an arbitrary source IP address, the CNP source address must be included in the UDP payload.

Figure 15:
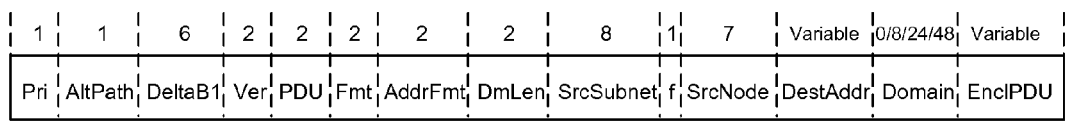
FIG. 15 illustrates the EIA/CEA-709.1 version 0 PDU format.
Figure 16:
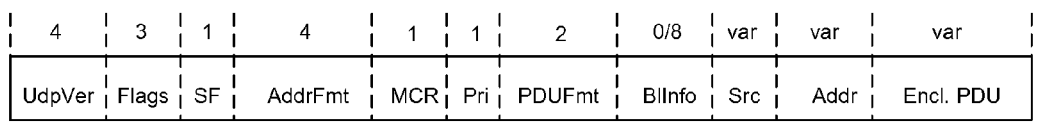
FIG. 16 illustrates the UDP payload portion of CIP packets according to some embodiments.

As detailed herein, CIP messages use UDP. The message format is derived from EIA/CEA-709.1, essentially replacing EIA/CEA-709.1 addressing with IPV6 or IPV4 addressing. The EIA/CEA-709.1 version 0 PDU has the format shown in FIG. 15. In some embodiments, the UDP payload portion of CIP packets has the format shown in FIG. 16. Exemplary fields include: 1) UdpVer which sets the transaction ID size; SF (source flag) which indicates whether the CNP address is derived from the source IP address; 3) AddrFmt indicates the addressing mode such as device ID from destination IP address, subnet/node addressing, domain broadcast, subnet broadcast (Addr contains the subnet ID), global broadcast (Addr contains the group ID), compressed group response (Addr contains the group ID and member number), explicit device ID (Addr contains the subnet and device ID), explicit subnet node (Addr contains the subnet ID, node ID, and an indication if this a group response); 4) MCR which indicates if this is a multicast request, Pri indicates if this is a priority packet; 5) Src which is the source address field; 6) SubnetID which is the source subnet ID; 7) NodeID which is the source node ID; 8) DmLen which is an encoded domain ID lengh; 9) DomainId which is the domain ID; and 10) Addr which is additional addressing information.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. For example, while the above description focused on peer-to-peer communications, in some embodiments a central server may include the mapping logic, etc. to form packets to be sent and received by devices on the network.

What is claimed is:

1. A method comprising:
   receiving a first packet at a mapping logic, wherein the first packet comprise a source Control Network Protocol ("CNP") address and a destination CNP address;
   determining a source IP address of the sender of the first packet from the source CNP address;

determining a destination IP address for the first packet;

forming a second packet without including the destination CNP address, wherein the second packet comprises the source IP address formed from the source CNP address, the destination IP address, and a payload that consists the source CNP address and an original payload of the first packet.

2. The method of claim 1, wherein the source CNP address contains a globally unique identifier.

3. The method of claim 2, wherein the globally unique identifier is a media access control address (MAC address) of a source device.

4. The method of claim 1, wherein the destination IP address is an arbitrary address not derived from the destination CNP address.

5. The method of claim 4, wherein the destination IP address is assigned by a DHCP server.

6. An apparatus comprising:

a processor; and memory to store mapping logic instructions, which when executed by the processor to cause the processor to:

receive a first packet, wherein the first packet comprise a source Control Network Protocol ("CNP") address and a destination CNP address, determine a source IP address of the sender of the first packet from the source CNP address, determine a destination IP address for the first packet, form a second packet without including the destination CNP address, wherein the second packet comprises the source IP address formed from the source CNP address, the destination IP address, and a payload that consists the source CNP address and an original payload of the first packet.

7. The apparatus of claim 6 wherein the source CNP address contains a globally unique identifier.

8. The apparatus of claim 7 wherein the globally unique identifier is a media access control address of a source device.

9. The apparatus of claim 6 wherein the destination IP address is an arbitrary address not derived from the destination CNP address.

10. The apparatus of claim 9 wherein the destination IP address is assigned by a DHCP server.

\* \* \* \* \*